Nov. 20, 1956     M. L. COURTER     2,771,473
ETHYLENE OXIDE RECOVERY
Filed Jan. 11, 1954
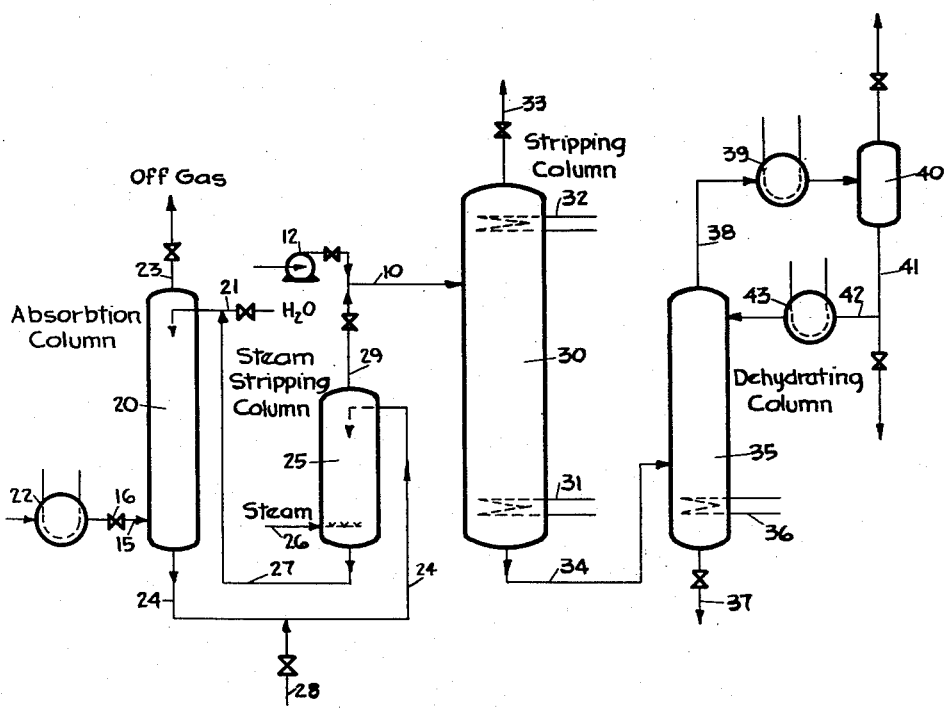
Inventor: Martin L. Courter
By: *E. Heller Mark*
His Agent

United States Patent Office 2,771,473
Patented Nov. 20, 1956

2,771,473

ETHYLENE OXIDE RECOVERY

Martin L. Courter, Walnut Creek, Calif., assignor to Shell Development Company, Emeryville, Calif., a corporation of Delaware Application January 11, 1954, Serial No. 403,337

6 Claims. (Cl. 260—348)

This invention relates to the recovery of ethylene oxide from aqueous ethylene oxide containing the ethylene oxide in admixture with contaminating amounts of normally gaseous impurities consisting essentially of oxides of carbon. The invention relates more particularly to the recovery of ethylene oxide from aqueous ethylene oxide-containing mixtures obtained in operations wherein the products resulting from the direct oxidation of normally gaseous hydrocarbons comprising ethylene are brought into contact with water.

Ethylene oxide-containing mixtures, such as those obtained by the direct catalytic oxidation of normally gaseous olefinic hydrocarbons comprising ethylene, generally consist predominantly of normally gaseous materials, such as nitrogen, oxides of carbon, unconverted reactants comprising ethylene and oxygen, etc., and contain the desired ethylene oxide in only relatively minor amount. Often the ethylene oxide content of the reaction mixture obtained by the catalytic oxidation of ethylene-containing hydrocarbons will not substantially exceed an amount equal to about two to three percent by weight of the total reactor effluence.

The recovery of ethylene oxide in a high state of purity in practical scale operation from mixtures containing so large an excess of normally gaseous materials and so little of the desired product presents serious difficulties. Ethylene oxide can be separated from hydrocarbon oxidation products by selective absorption in a suitable solvent, such as, for example, water. Ethylene oxide may thereupon be separated from the resulting aqueous ethylene oxide by a steam stripping. In such a process the overhead from the steam stripping operation will generally comprise not only ethylene oxide and water, but varying amounts of residual normally gaseous impurities consisting predominantly of oxides of carbon.

Ability to utilize ethylene oxide efficiently in many important fields of application is dependent upon the absence therein not only of water but of normally gaseous impurities comprising oxides of carbon. Relatively pure ethylene oxide is obtained from the impure aqueous ethylene oxide by distilling the ethylene oxide therefrom in admixture with the normally gaseous impurities and thereafter effecting a purification of the substantially water-free, impure ethylene oxide thus obtained. However, the treatment of such a mixture of normally gaseous components involving their separation is often costly, particularly in view of the fact that substantially all of the normally gaseous impurities including carbon dioxide must be removed from the ethylene oxide. A further advantage in such an expedient resides in the fact that generally the ethylene oxide is obtained as a bottoms product. This entails the loss of substantial amounts of ethylene oxide. Recovering the ethylene oxide as a bottoms product often results in the presence therein of contaminating amounts of materials higher boiling than ethylene oxide due to entrainment or actual formation during the purification process.

In accordance with the present invention substantially dry ethylene oxide, free of normally gaseous impurities comprising oxides of carbon, is obtained as an overhead product from impure aqueous ethylene oxide containing the ethylene oxide in admixture with normally gaseous impurities comprising oxides of carbon, by subjecting said impure aqueous ethylene oxide to a stripping operation in a first separating zone under conditions effecting the separation of a gaseous fraction consisting essentially of normally gaseous materials lower boiling than ethylene oxide including oxides of carbon from a liquid fraction consisting essentially of aqueous ethylene oxide free of normally gaseous impurities comprising oxides of carbon, and thereafter separating ethylene oxide from said liquid fraction in a second separating zone.

The process of the invention may be applied to the separation of ethylene oxide from impure aqueous ethylene oxide-containing mixtures comprising ethylene oxide in admixture with normally gaseous containing impurities from any suitable source. It is applied with particular advantage, however, to the recovery of ethylene oxide from impure aqueous ethylene oxide obtained by contacting with water, as in a quenching or scrubbing operation products of direct oxidation of normally gaseous hydrocarbons comprising ethylene. When applying the process of the invention to the recovery of pure aqueous ethylene oxide from the total oxidation products resulting from the direct oxidation of normally gaseous hydrocarbons comprising ethylene the products of the oxidation are first contacted with water in an absorption zone under conditions resulting in the selective absorption of ethylene oxide in water. Ethylene oxide is thereupon stripped from the ethylene oxide-rich aqueous absorbate under conditions avoiding the formation of any substantial amounts of glycol. The resulting aqueous absorbate is thereupon subjected to the two-stage ethylene oxide recovery in accordance with the invention. The ethylene oxide containing mixtures, to the separation of which the process of the invention is applied, include those obtained by oxidation of ethylene-containing hydrocarbon mixtures with oxygen as such or with oxygen-containing gases such as, for example, air.

In order to set forth more clearly the nature of the invention it is described in detail hereinafter with reference to the attached drawing in its application to the recovery of ethylene oxide from a mixture obtained by the oxidation of normally gaseous olefinic hydrocarbons comprising ethylene with air.

An impure aqueous ethylene oxide-containing mixture consisting essentially of water, ethylene oxide and normally gaseous impurities comprising carbon dioxide, obtained from any suitable outside source is forced through valved line 10 by means of pump 12 into a suitable fractionating zone. The impure aqueous ethylene oxide-containing mixture thus introduced into the system through line 10 may be obtained from any suitable source. It may be obtained by absorption with water of the oxidation products obtained by the direct catalytic oxidation of ethylene with molecular oxygen. Thus, an ethylene oxide-containing mixture obtained by the oxidation of normally gaseous hydrocarbons comprising ethylene with air in the presence of a silver-containing catalyst and consisting predominantly of nitrogen, unconverted normally gaseous hydrocarbons comprising ethylene, oxygen, carbon dioxide, etc., and containing ethylene oxide in only a minor amount, for example, in the range of from about 1 to about 3%, is passed through line 15, containing valve 16, into an absorption zone. The absorption zone may comprise any suitable type of apparatus enabling contact of the normally gaseous ethylene oxide-containing charge with a solvent, such as, for example, an absorption column 20. Such absorption column may be provided with suitable trays, baffles, solid packing material, or the like. An absorbent capable of selectively absorbing the ethylene oxide, such as, for example, water, is introduced into the upper part of column 20 by means of valved line 21. Conditions within column 20 are controlled to result in the selective absorption of ethylene oxide from the ethylene oxide-containing gases passing upward through the column countercurrent to the liquid aqueous solvent.

Suitable conditions to be maintained within column 20 comprise, for example, a temperature in the range of from about 5° C. to about 80° C., preferably from about 20° C. to about 40° C., and a pressure in the range of, for example, from about 50 to about 300 pounds. Maintenance of the desired conditions of temperature within column 20 is aided by the provision of suitable means to control the temperature of the gaseous feed entering column 20 through line 15, and of the aqueous solvent emanating through line 21. The ethylene oxide-containing gaseous stream may be passed directly from the oxidation reactor through line 15 into column 20. A cooler 22 is provided in line 15 to enable the reduction of the temperature of the ethylene oxide-containing charge from the reaction temperature to one conducive to the maintenance of desired temperature conditions within column 20. Other means not shown in the drawing may be resorted to to aid in maintaining the desired conditions within column 20.

Within column 20 selective absorption of ethylene oxide in water takes place resulting in the formation of a fat aqueous solvent containing impure ethylene oxide and of a gaseous fraction consisting predominantly of the normally gaseous materials other than ethylene oxide introduced into the column 20, and consisting essentially of unconverted normally gaseous hydrocarbons, nitrogen, oxides of carbon, oxygen, etc. The gaseous fraction is eliminated from column 20 through valved line 23. The gaseous fraction thus passed through line 23 may be passed in part or in its entirety to a hydrocarbon oxidizing zone producing ethylene-oxide containing reaction products. Before passing to the oxidation zone, the gaseous stream emanating from column 20 through line 23 may be passed through a suitable carbon dioxide recovery zone to effect the removal of carbon dioxide therefrom. Such carbon dioxide recovery zone may comprise an absorber wherein the gaseous stream is contacted with a suitable solvent for carbon dioxide, such as, for example, aqueous potassium hydroxide, at an elevated temperature in the range of, for example, from about 80° C. to about 160° C., thereby selectively absorbing carbon dioxide in the hot aqueous potassium hydroxide.

Fat solvent is withdrawn from column 20 and passed through line 24 into a suitable stripping zone comprising, for example, a stripping column 25. Within stripping column 25 conditions are maintained resulting in the stripping of ethylene oxide from the fat solvent. The suitable conditions may be obtained, for example, by injection of steam into the lower part of stripping column 25, by means of valved line 26, under conditions resulting in the formation of a column overhead consisting essentially of ethylene oxide and steam.

Conditions within stripping column 25 are controlled to avoid the conversion of any substantial amount of ethylene oxide to ethylene glycol during the stripping operation within column 25. Although the stripping operation may be carried out at subatmospheric, atmospheric or superatmospheric pressures in accordance with the process of the invention it is preferred to effect the stripping operation at a slightly elevated pressure, for example, in the range of from about 20 to about 80 pounds absolute.

A valved line 28 is provided for the introduction of impure aqueous ethylene oxide comprising ethylene in admixture with normally gaseous impurities comprising oxides of carbon into the system. Such impure aqueous ethylene oxide introduced into the system through valved line 28 may comprise a part or all of the impure aqueous ethylene oxide introduced as charge into the process of the invention. In column 25 at least a substantial part of the ethylene oxide will be stripped from the aqueous fat solvent charged thereto, leaving lean solvent devoid of any substantial amount of ethylene oxide as bottoms.

Lean aqueous solvent free of any substantial amount of ethylene oxide is withdrawn from the lower part of column 25, cooled and recycled through line 27 to an upper part of absorption column 21. In a preferred method of carrying out the process any remaining residual ethylene oxide in the lean solvent is converted to ethylene glycol prior to cooling and prior to recycling the solvent to the absorption column 20 as described and claimed in co-pending application Serial No. 389,593, filed November 2, 1953, now Patent No. 2,756,241.

Even under the most carefully controlled conditions commensurate with practical scale operation the overhead from stripping column 25 will comprise in addition to ethylene oxide and steam a certain amount of entrained normally gaseous impurities consisting predominantly of oxides of carbon, such as, for example, $CO_2$. Such steam stripper overhead produced in stripping column 25 is therefore passed from stream stripper 25 through valved line 29 into line 10 leading into an impure aqueous ethylene oxide stripping zone. This stripping zone may comprise a stripping column 30. Stripping column 30 is provided with suitable heating means in the lower part thereof, such as, for example, a reboiler or a closed heating coil 31, and suitable cooling means in the upper part thereof, such as, for example, a partial condenser or a cooling coil 32. Within stripper 30 the impure aqueous ethylene oxide stream charged thereto through line 10 is subjected to stripping conditions resulting in the separation of a gaseous fraction consisting essentially of normally gaseous impurities comprising carbon dioxide and some ethylene oxide from a liquid fraction consisting essentially of water and ethylene oxide substantially free of normally gaseous impurities comprising carbon dioxide. The gaseous fraction comprising the carbon dioxide-containing normally gaseous impurities and some ethylene oxide is eliminated from column 30 through valved line 33. The liquid fraction comprising aqueous ethylene oxide is passed from the lower part of column 30 through line 34 to a dehydrating zone.

The dehydrating zone may comprise a suitable dehydrating column such as, for example, column 35, provided with suitable means for the introduction of heat into the lower part thereof, such as, for example, a reboiler or a closed heating coil 36. Within column 35 conditions of distillation are maintained to effect the separation therein of a gaseous fraction consisting essentially of ethylene oxide which is free of any substantial amount of water and of normally gaseous impurities comprising oxides of carbon from a normally liquid fraction consisting essentially of water. The liquid fraction is withdrawn from column 35 through valved line 37 and eliminated from the system. A part or all of such liquid fraction withdrawn from column 35 through valved line 37 may be passed to suitable means capable of converting residual ethylene oxide to ethylene glycol. The gaseous fraction is removed overhead from column 35 through line 38 provided with cooler 39 discharging into the accumulator 40. Condensate consisting of ethylene oxide, free of any substantial amount of water and of normally gaseous impurities, is taken from accumulator 40 through valved line 41 as a final product. A portion of the liquid withdrawn from accumulator 40 through line 41 is passed through line 42, provided with cooler 43, as reflux into the upper part of column 35.

In accordance with the above method of recovering ethylene oxide from aqueous ethylene oxide contaminated with normally gaseous mixtures comprising carbon dioxide, the ethylene oxide is obtained as an overhead product substantially free of water and normally gaseous impurities. Such ethylene oxide recovery in the process of the invention is obtained with exceptionally high yields; the removal of substantially all of the last traces of normally gaseous impurities comprising carbon dioxide is obtained with the passage of no more than about two to about three percent of the total charge to column 30 through line 33. Impurities in admixture with ethylene oxide thus eliminated overhead from column 30 may be passed to suitable carbon dioxide separating means and recycled to the system at a point thereof preceding column 30. The efficiency with which ethylene oxide is recovered in substantially anhydrous state substantially free of normally gaseous impurities is evidenced by the following example:

*Example*

An aqueous ethylene oxide, containing ethylene oxide in admixture with inert gases consisting essentially of carbon dioxide, is produced by passing the total products resulting from the catalytic oxidation of ethylene-containing normally gaseous hydrocarbons with air, through an absorption column countercurrent to a stream of water. The total products of the hydrocarbon oxidation contain 2.2 parts of ethylene oxide and 35 parts of nitrogen, the rest of the mixture consisting of methane, ethane, oxides of carbon, ethylene and argon. In the absorption column ethylene is absorbed in the water solvent. The resulting ethylene oxide-containing fat solvent is steam stripped. The aqueous ethylene oxide obtained as overhead in the stripper operation consists essentially of ethylene oxide, steam and normally gaseous impurities in a ratio of 64:35:1 parts by weight; the normally gaseous impurities consisting predominately of carbon dioxide. The carbon dioxide contaminated aqueous ethylene oxide thus obtained was introduced into a stripping column. In the stripping column material lighter boiling than ethylene oxide is stripped from the aqueous ethylene oxide charge to the column and removed therefrom as vapor overhead. Forming a stripper column overhead equal in amount to only 2% by weight of the feed to the stripping column results in the production of a liquid bottoms fraction consisting of aqueous ethylene oxide containing no detectable amount of carbon dioxide. The liquid aqueous ethylene oxide bottoms, now containing about 40 mol. percent ethylene oxide and 60 mol. percent water, are passed from the stripping column into a twenty-seven plate dehydration column. Ethylene oxide is distilled from the aqueous charge to the column with a reflux to top product ratio of 2. The ethylene oxide removed as overhead from the ethylene oxide dehydration column consisted essentially of 99.98% ethylene oxide and 0.02% water and contains no detectable amount of carbon dioxide.

For the purpose of clarity, all parts of apparatus not essential to a complete understanding of the invention, such as, for example, pumps, condensers, accumulators, valves, tanks, etc., have been omitted from the drawing and the detailed description of the invention.

The invention claimed is:
1. In a process for separating ethylene oxide from a gaseous mixture containing ethylene oxide in admixture with normally gaseous materials comprising oxides of carbon wherein ethylene oxide is separated from said mixture by absorption in an aqueous solvent thereby forming a fat aqueous solvent rich in dissolved ethylene oxide and containing normally gaseous impurities consisting essentially of oxides of carbon, and an aqueous fraction comprising ethylene oxide in admixture with contaminating amounts of normally gaseous impurities consisting essentially of oxides of carbon is stripped from said resulting fat aqueous solvent, the improvement which comprises introducing said aqueous fraction into a stripping zone, separating a vapor fraction comprising oxides of carbon from a liquid fraction consisting essentially of aqueous ethylene oxide free of any substantial amount of oxides of carbon in said stripping zone, passing said liquid fraction from said stripping zone into a dehydrating zone, and distilling a vapor fraction consisting essentially of ethylene oxide from said liquid fraction in said dehydrating zone.

2. The process in accordance with claim 1 wherein said oxide of carbon is carbon dioxide.

3. The process in accordance with claim 1 wherein said gaseous mixture containing ethylene oxide is obtained by the direct oxidation of ethylene with molecular oxygen.

4. In a process for separating ethylene oxide from a gaseous mixture containing ethylene oxide in admixture with normally gaseous components comprising oxides of carbon by a sequence of steps wherein ethylene oxide is separated from said mixture by absorption in an aqueous solvent thereby forming a fat aqueous solvent rich in dissolved ethylene oxide and containing normally gaseous impurities consisting essentially of oxides of carbon, the improvement which comprises steam stripping said resulting fat aqueous solvent in a first stripping zone without forming any substantial amount of ethylene glycol at a pressure of from about 20 to about 80 pounds, thereby separating an aqueous ethylene oxide fraction comprising ethylene oxide, water and contaminating amounts of oxides of carbon from a liquid fraction consisting predominantly of water in said first stripping zone, passing said aqueous ethylene oxide fraction from said first stripping zone into a second stripping zone, separating a vapor fraction consisting essentially of normally gaseous materials comprising oxides of carbon from a liquid fraction consisting essentially of aqueous ethylene oxide free of any substantial amount of oxides of carbon in said second stripping zone, passing said liquid fraction from said second stripping zone into a dehydrating zone, and distilling ethylene oxide free of any substantial amount of oxides of carbon from said aqueous fraction in the said dehydrating zone.

5. The process in accordance with claim 4 wherein said oxide of carbon is carbon dioxide.

6. The process in accordance with claim 4 wherein said gaseous mixture containing ethylene oxide is obtained by the direct oxidation of ethylene with molecular oxygen.

References Cited in the file of this patent

UNITED STATES PATENTS

| | | |
|---|---|---|
| 2,135,271 | Balcar | Nov. 1, 1938 |
| 2,169,210 | Balcar | Aug. 15, 1939 |
| 2,325,576 | Balcar | July 27, 1943 |
| 2,430,443 | Becker | Nov. 11, 1947 |
| 2,615,901 | McClellan | Oct. 28, 1952 |
| 2,756,241 | Courter | July 24, 1956 |